(12) United States Patent  
Mekenkamp et al.

(10) Patent No.: US 7,543,111 B2  
(45) Date of Patent: Jun. 2, 2009

(54) METHOD AND DEVICE FOR STORING CONTENT ON A REMOVABLE MEDIUM

(75) Inventors: Gerhardus Engbertus Mekenkamp, Eindhoven (NL); Igor Wilhelmus Franciscus Paulussen, Eindhoven (NL); Godert Willem Renswoud Leibbrandt, Eindhoven (NL); Godefridus Antonius Maria Crienen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 450 days.

(21) Appl. No.: 10/540,806

(22) PCT Filed: Nov. 20, 2003

(86) PCT No.: PCT/IB03/05711

§ 371 (c)(1), (2), (4) Date: Jun. 27, 2005

(87) PCT Pub. No.: WO2004/059534

PCT Pub. Date: Jul. 15, 2004

(65) Prior Publication Data

US 2006/0075018 A1    Apr. 6, 2006

(30) Foreign Application Priority Data

Dec. 30, 2002   (EP)   .................... 02080542

(51) Int. Cl.
*G06F 12/02* (2006.01)
(52) U.S. Cl. ................................... 711/115
(58) Field of Classification Search ............. 711/115; 709/217, 219

See application file for complete search history.

(56) References Cited

U.S. PATENT DOCUMENTS

| 2002/0048222 A1 | 4/2002 | Wright et al. |
| 2002/0099952 A1* | 7/2002 | Lambert et al. ............ 713/200 |

FOREIGN PATENT DOCUMENTS

| WO | WO 00/63916 | 10/2000 |
| WO | WO 02/05128 | 1/2002 |
| WO | WO 02/067125 | 8/2002 |

OTHER PUBLICATIONS

Panasonic DVD Video Recorder Operating Instructions Model No. DMR-HS2, pp. 2-75.

* cited by examiner

*Primary Examiner*—Kevin L Ellis

(57) ABSTRACT

The method consists of providing (1) a user interface for selecting a content item stored on a storage means, retrieving (3) a further content item related to the content item from a system on a network using an identification of the content item, and storing (5) the further content item on the removable medium. The electronic device contains a writer (23), a control unit (25), and a network interface (27). The control unit (25) is able to use an input device and an output device to enable a user to select a content item stored on a storage means (33), to use the network interface (27) for retrieving a further content item related to the content item from a system on a network using an identification of the content item, and to use the writer (23) for storing the further content item on the removable medium. The computer program product enables, upon its execution, a programmable apparatus to function as the electronic device.

8 Claims, 1 Drawing Sheet

METHOD AND DEVICE FOR STORING CONTENT ON A REMOVABLE MEDIUM

The invention relates to a method of storing content on a removable medium, the method comprising the steps of providing a user interface for selecting a content item stored on a storage means and storing content on the removable medium.

The invention further relates to an electronic device for storing content on a removable medium, the electronic device comprising a writer able to store content on the removable medium, a control unit able to use an input device and an output device to enable a user to select a content item stored on a storage means.

The invention also relates to a computer program product enabling, upon its execution, a programmable apparatus to function as an electronic device for storing content on a removable medium.

An embodiment of this method is applied in well-known consumer electronic devices comprising both a hard disk and a Digital Video Disk "DVD" writer, e.g. the PANASONIC™ DMR-HS2 DVD writer. A user of such a consumer electronics device is able to select a program, e.g. a television program, recorded on the hard disk to be written to a DVD using the DVD writer. The program is generally copied from the hard disk to the DVD as it was recorded on the hard disk. However, the written DVD may contain disturbances due to transmission errors and may not contain the extra content that buyers of pre-recorded DVDs have become accustomed to.

It is a drawback of the known method that it hardly enhances the selected programs for permanent storage.

It is a first object of the invention to provide a method of the kind described in the opening paragraph, by which content is enhanced for permanent storage.

It is a second object of the invention to provide an electronic device of the kind described in the opening paragraph, which is able to enhance content for permanent storage.

According to the invention the first object is realized in that further comprised is the step of retrieving a further content item related to the content item from a system on a network using an identification of the content item; and the step of storing content on the removable medium comprises storing the further content item on the removable medium. The popularity of pre-recorded DVD-video discs is in part due to the bonus material supplied on these discs. By retrieving a further content item related to the content item, e.g. bonus material, and storing the further content item with the content item on a removable medium, e.g. a DVD+RW (re-writeable), the removable medium has a value which is more similar to that of a pre-recorded DVD-video disc.

In an embodiment of the method of the invention, the step of storing content on the removable medium further comprises storing the content item on the removable medium. This step is advantageous if the content item has first been stored on a non-removable storage means, e.g. a hard disk. Alternatively, the content item may already be stored on the removable medium.

Further comprised may be the step of providing a user interface for paying for the further content item. By letting a user pay for the further content item, content creators are able to profit further from a popular content item. This is especially of importance in the light of commercial skipping features of new consumer electronics devices, possibly leading to a reduction in advertisement revenues. Revenues of the further content item can even be used to finance the production of a sequel to the content item if advertisement revenues alone are not sufficient.

Further comprised may be the step of authenticating to the system. Instead of or in addition to paying per content item, a user may need to pay a subscription fee per period. An electronic device, for example, may have to authenticate to the system to enable the system to determine whether the user is a subscriber.

The step of retrieving a further content item may comprise retrieving at least one of: a removed scene, an added scene, a biography, a documentary, an image, an advertisement, a menu, a menu comprising an advertisement, and a trailer. Many of these items have proven to be successful on pre-recorded DVD-video discs. On pre-recorded DVD-video discs, a menu enhances access to the content item and to bonus material. An advertisement may be incorporated in a menu to make a user payment smaller or unnecessary. The menu comprising the advertisement may be stored in such a way that it is not possible for a user to skip the advertisement.

The step of storing content on the removable medium may further comprise storing a menu on the removable medium. When a menu cannot be retrieved from the system, this step may be executed to create a menu and store the menu on the removable medium.

The step of retrieving a further content item may comprise retrieving a part of a master copy of the content item, the part not being present in the content item. Sometimes, the beginning or ending of a television "TV" program, e.g. credits of a movie, may be missing. There may also be an interfered part due to a bad signal. This may not be a problem for temporarily stored content, but is not desirable in permanently stored content. The missing or interfered parts may be retrieved to make the content item of the same quality as the master copy. Furthermore, the master copy may comprise multiple layers of data, in which the combination of all of the multiple layers represents a highest quality. If not all of the multiple layers are present in the content item, a missing layer may be retrieved to make the content item of the same quality as the master copy.

According to the invention, the second object is realized in that further comprised is a network interface; the control unit is able to use the network interface to retrieve a further content item related to the content item from a system on a network using an identification of the content item; and the control unit is able to use the writer to store the further content item on the removable medium.

In an embodiment of the electronic device of the invention, further comprised is the storage means.

These and other aspects of the method and the electronic device of the invention will be further elucidated and described with reference to the drawing, in which.

Corresponding elements within the drawing are identified by the same reference numerals.

Figure 1:
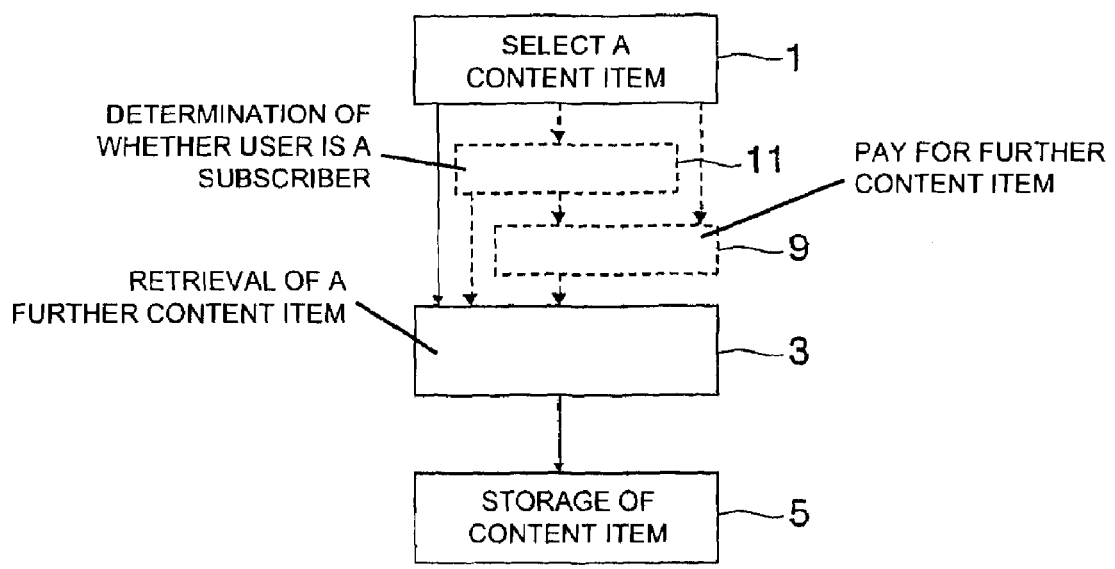
FIG. 1 is a flow chart of the method.

In FIG. 1, the method of storing content on a removable medium comprises a step 1 providing a user interface for selecting a content item stored on a storage means. The storage means may be, for example, a hard disk or a DVD-writer containing a DVD+RW. A user may, for example, be able to select the content item based on its title, on an index number, or on a date and/or time of recording. The method also comprises a step 3 of retrieving a further content item related to the content item from a system on a network using an identification of the content item. The user may be able to determine which of multiple further content items is retrieved, for example, in a further step of the method or during configuration of the method. The network may be, for example, the Internet and the system may be, for instance, an Hyper Text Transfer Protocol "HTTP" server. The identification may be, for example, a title, a fingerprint of the content item, an identifier embedded in the content item, or an identifier embedded in an electronic program guide entry of the content item. An identifier may also comprise an address of the system. The identification may be sent to the system encoded or partly encoded in Extensible Markup Language "XML". The method further comprises a step 5 for storing content on the removable medium. Step 5 comprises storing the further content item on the removable medium. The removable medium may be, for example, a DVD+RW, a BLU-RAY™ optical disc format, or a holographic medium.

Step 5 may further comprise storing the content item on the removable medium. Further comprised may be a step 9 providing a user interface for paying for the further content item. The user may, for example, be able to provide credit card details or may be shown instructions on how to pay using a phone. Further comprised may be a step 11 authenticating to the system. An electronic device, for example, may have to authenticate to the system to enable the system to determine whether a user is a subscriber. In step 11, the user may be requested to provide authentication parameters, e.g. a name and a password. Alternatively, the user may be able to configure authentication parameters in the electronic device.

Step 3 of retrieving a further content item may comprise retrieving at least one of: a removed scene, an added scene, a biography, a documentary, an image, an advertisement, a menu, a menu comprising an advertisement, and a trailer. Step 5 may further comprise storing a menu on the removable medium.

Step 3 of retrieving a further content item may comprise retrieving a part of a master copy of the content item, the part not being present in the content item. The part that is not present in the content item may be detected by searching the content item for errors. Step 3 may, for example, comprise this search for errors. Error detection may also occur while storing the content item. Information regarding detected errors may be stored on the removable medium or on the storage means. Identification, e.g. a fingerprint, of a first part and/or a last part of the content item may be transmitted to the system or a further system on the network. The system or the further system may be able to determine a part of the master copy that precedes the first part of the content item and/or a part of the master copy that follows the last part.

Figure 2:
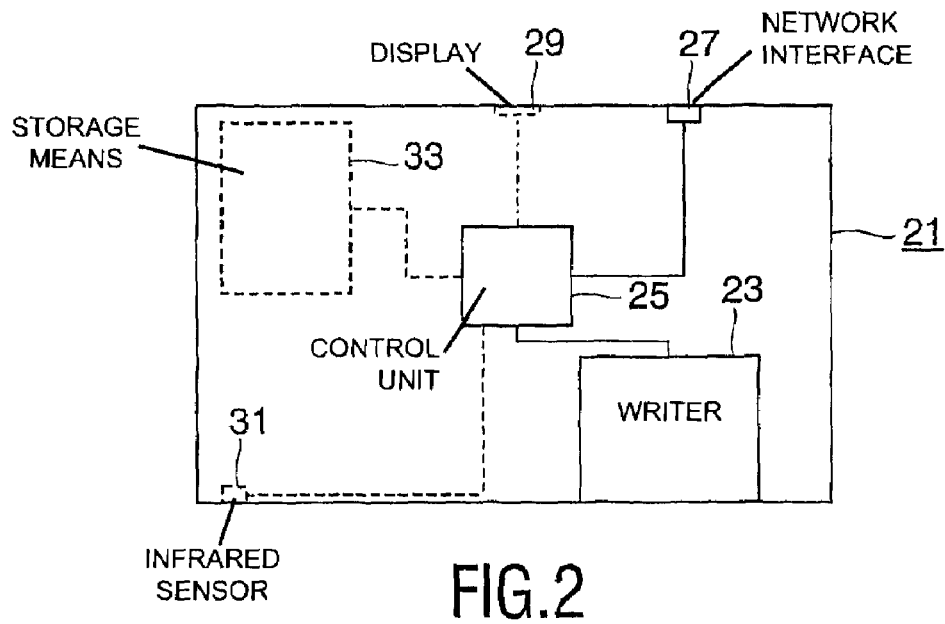
FIG. 2 is a block diagram of the electronic device.

In FIG. 2, the electronic device 21 for storing content on a removable medium comprises a writer 23, a control unit 25, and a network interface 27. The writer 23 is able to store content on the removable medium. The control unit 25 is able to use an input device and an output device to enable a user to select a content item stored on a storage means 33. The control unit 25 is also able to use the network interface 27 to retrieve a further content related to the content item from a system on a network using an identification of the content item. The control unit 25 is further able to use the writer 23 to store the further content item on the removable medium. Further comprised may be the storage means 33. The electronic device 21 may be, for example, a DVD-recorder. The writer 23 may be, for example, a DVD writer or a Blu-Ray writer. The control unit 25 may be, for example, a microprocessor. The storage means 33 may be, for example, a hard disk. Alternatively, the storage means may be the writer 23 containing the removable medium. The input device may be, for example, a remote control able to transmit to an infrared sensor 31. The output device may be, for example, a TV connected to a connector 29 or a display of the electronic device 21. The connector 29 may be, for example, an antenna socket, a Cinch socket, or a Syndicat des Constructeurs d'Appareils Radiorécepteurs et Téléviseurs "SCART" connector. The network interface 27 may be, for example, an Ethernet connector, e.g. unshielded twisted pair "UTP" or Bayonet Neill Concelman "BNC". Alternatively, the network interface 27 may comprise a wireless transmitter and a wireless receiver.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. In the device claim enumerating several means, several of these means can be embodied by one and the same item of hardware. 'Computer program' is to be understood to mean any software product stored on a computer-readable medium, such as a floppy disk, downloadable via a network, such as the Internet, or marketable in any other manner.

The invention claimed is:

1. A method of storing content on a removable medium, the method comprising the steps of:

providing a user interface for selecting a first content item stored on a storage means;

retrieving a further content item related to the first content item from a system on a network using an identifier of the first content item, said identifier being an indicator selected from the group consisting of a fingerprint of the content item, an identifier embedded in the content item, an identifier embedded in an electronic program guide entry of the content item, and an address of the system, said further content item comprising a part of a master copy of the first content item, said part not being present in the first content item; and storing the further content on the removable medium.

2. The method as claimed in claim 1, wherein the method further comprises the step of:

storing the first content item on the removable medium.

3. The method as claimed in claim 1, wherein the method further comprises the step of:

providing a user interface for paying for the further content item.

4. The method as claimed in claim 1, wherein said method further comprises the step of:

determining whether a user is a subscriber.

5. The method as claimed in claim 1, wherein the step of retrieving a further content item comprises retrieving at least one of: a removed scene, an added scene, a biography, a documentary, an image, an advertisement, a menu, a menu comprising an advertisement, and a trailer.

6. The method as claimed in claim 1, wherein the step of storing the further content on the removable medium further comprises storing a menu on the removable medium.

7. An electronic device for storing content on a removable medium, the electronic device comprising:
- a storage means having context stored thereon;
- a writer for storing content on the removable medium;
- a network interface; and
- a control unit having an input device to enable a user to select a first content item stored on a storage means,
- the control unit being operative to use the network interface to retrieve a further content item related to the first content item from a system on a network using an identifier of the content item,
- the identifier being an indicator selected from the group consisting of a fingerprint of the content item, an identifier embedded in the content item, an identifier embedded in an electronic program guide entry of the content item, and address of the system, said further content item comprising a part of a master copy of the first content item, said part not being present in the first content item, and
- the control unit controlling the writer to store the further content item on the removable medium.

8. A computer storage medium embodying program instructions that when executed, cause a programmable apparatus to function as an electronic device for storing content on a removable medium, comprising functions for:
- providing a user interface for selecting a first content item stored on a storage means;
- retrieving a further content item related to the first content item from a system on a network using an identifier of the content item, wherein the identifier is an indicator selected from the group consisting of a fingerprint of the content item, an identifier embedded in the content item, an identifier embedded in an electronic program guide entry of the content item, and address of the system, said further content item comprising a part of a master copy of the first content item, said part not being present in the first content item; and
- storing the further content item on the removable medium.

* * * * *